S. J. SYDNEY.
PNEUMATIC TIRE.
APPLICATION FILED APR. 21, 1914.
1,123,034.
Patented Dec. 29, 1914.
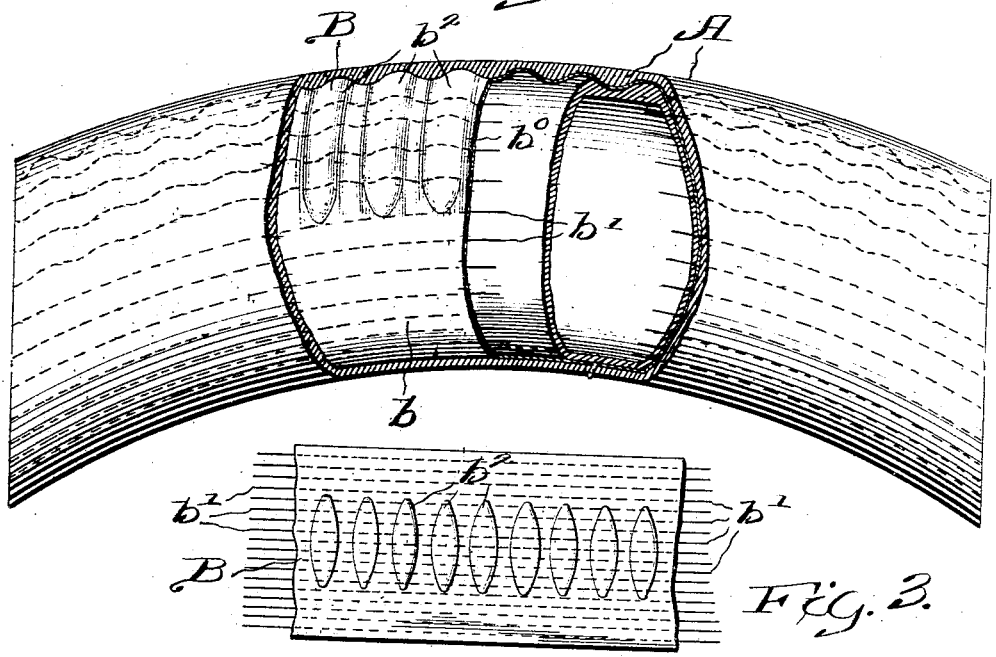
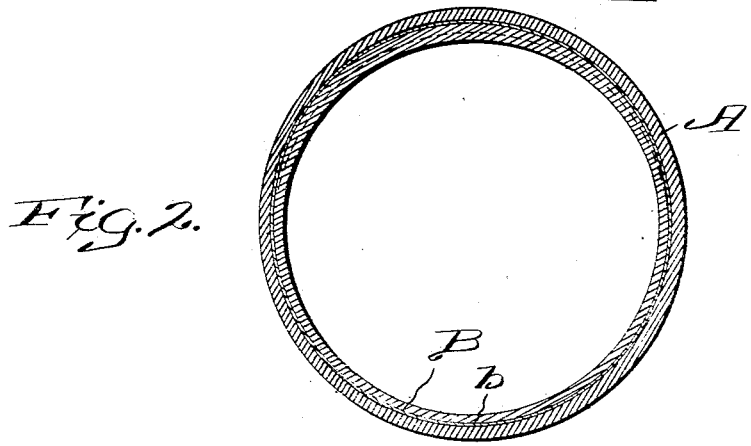
Witnesses
Edwin Beller
H. W. Primm
Inventor
Sidney J. Sydney
by Wilkinson Guster & Mackaye
Attorneys

UNITED STATES PATENT OFFICE.

SIDNEY J. SYDNEY, OF PHILADELPHIA, PENNSYLVANIA, ASSIGNOR OF ONE-HALF TO DAVID W. ALEXANDER, OF TORONTO, ONTARIO, CANADA.

PNEUMATIC TIRE.

1,123,034.　　　　Specification of Letters Patent.　　Patented Dec. 29, 1914.

Application filed April 21, 1914. Serial No. 833,484.

*To all whom it may concern:*

Be it known that I, SIDNEY J. SYDNEY, a citizen of the United States, residing at Philadelphia, in the county of Philadelphia and State of Pennsylvania, have invented certain new and useful Improvements in Pneumatic Tires; and I do hereby declare the following to be a full, clear, and exact description of the invention, such as will enable others skilled in the art to which it appertains to make and use the same.

My invention relates to improvements in the manufacture of pneumatic tires, and more especially of the inner tubes for automobile tires, and it consists in providing a special form of textile fabric embodied in the rubber of the shoe of the tire or tube, so as to freely permit the expansion and contraction, both laterally and circumferentially, of the tread portion thereof.

It is well known that such inner tubes ordinarily consist of a body portion of rubber, and when it has been attempted to reinforce these with some textile fabric, the latter has been found to yield unequally, and that it will stretch in one direction and contract in the other direction, with the resulting effect of tearing the rubber, or the failure of the device to operate properly.

It is well known that ordinary textile fabrics if stretched in one direction will contract in a direction at right angles thereto, but according to my present invention I provide a reinforce made of textile material which will yield freely in both directions when stretched.

My invention will be understood by reference to the accompanying drawings, in which:—

Figure 1 shows the inner tube of the tire when inflated, parts being broken away; Fig. 2 shows a transverse section through the said inner tube when in the inflated condition; and Fig. 3 shows, on a smaller scale, a strip of the woven material adapted for use in reinforcing the tire or tube.

A represents the body of the inner tube, made of rubber in the usual way, embedded in which is the textile fabric B, part of which $b$ is woven of material adapted to stretch laterally, and is provided with strengthening strands or ribs $b'$ which strengthen the band circumferentially, and at the same time limits to a small amount the circumferential stretching of the band, and also permit the stretching of the band laterally.

The other portion $b^2$ of the band is similarly provided with strengthening ribs or strands $b'$, but is woven in the corrugated form circumferentially, as shown at $b^2$, the result being that the textile fabric is not only free to stretch laterally in a normal way, but these corrugations tend to straighten out as the rubber is stretched, thus permitting free stretching of the band longitudinally.

In practice, it is desirable only to have the convolutions in the tread portion or outer half of the tire or tube as shown in Fig. 1; this portion being subjected to the alternate compressions and expansions due to the use of the tire on the road. The inner half of the member is not subjected to such expansions and contractions, or is subjected to them in a very minor degree, and it will not be necessary to have these corrugations on the inner half of said tube.

It will obviously be preferable to have the corrugations of the greatest depth in the center of the tread portion and have the same fade away toward the inner portion of the member, as shown in Figs. 1 and 2.

By the herein described construction a thoroughly flexible reinforced inner tube is secured, which is especially adapted for long and hard usage.

While I have described the construction as applied to inner tubes for pneumatic tires, to which is is especially adapted, it will be obvious that it is also adapted for use in the manufacture of treads for tires or other like structures where a reinforced construction is desired which will stretch freely both longitudinally and laterally when subjected to pressure, especially when said pressure is irregularly applied.

I claim as my invention.

A reinforced rubber tube for use in pneumatic tires, comprising a strip of textile material embedded in said rubber tube and provided with transverse corrugations woven therein along the central portion thereof, said corrugations being formed of a lenticular shape, and tapering toward the edges thereof, substantially as described.

In testimony whereof, I affix my signature, in presence of two witnesses.

SIDNEY J. SYDNEY.

Witnesses:
R. S. CONRAD,
PERCY S. BICKMORE.